United States Patent [19]

Tsujimoto

[11] Patent Number: 5,119,401
[45] Date of Patent: Jun. 2, 1992

[54] DECISION FEEDBACK EQUALIZER INCLUDING FORWARD PART WHOSE SIGNAL REFERENCE POINT IS SHIFTABLE DEPENDING ON CHANNEL RESPONSE

[75] Inventor: Ichiro Tsujimoto, Tokyo, Japan

[73] Assignee: NEC Corporation, Tokyo, Japan

[21] Appl. No.: 615,617

[22] Filed: Nov. 19, 1990

[30] Foreign Application Priority Data

Nov. 17, 1989 [JP] Japan .................... 1-299333
Mar. 30, 1990 [JP] Japan .................... 2-85636
Mar. 30, 1990 [JP] Japan .................... 2-85637

[51] Int. Cl.$^5$ .......................... H04B 3/08; H03H 7/30
[52] U.S. Cl. ................................. 375/14; 333/18; 364/724.2
[58] Field of Search ................ 375/11, 12, 13, 14, 375/15, 16; 333/18; 364/724.16, 724.2

[56] References Cited

U.S. PATENT DOCUMENTS

| 3,974,449 | 8/1976 | Falconer | 338/18 |
| 4,025,719 | 5/1977 | Nussbaumer | 375/15 |
| 4,520,489 | 5/1985 | Hogge, Jr. | 375/14 |
| 4,539,690 | 9/1985 | Speidel | 364/724.16 |
| 4,985,902 | 1/1991 | Gurcan | 375/14 |

Primary Examiner—Stephen Chin
Attorney, Agent, or Firm—Whitham & Marhoefer

[57] ABSTRACT

A center tap of a transversal filter, which forms part of a forward equalizer, is shifted by at least one symbol interval. An error signal is generated using a decision output and tap outputs of the forward and backward equalizers. An impulse response estimation circuit is provided to receive the decision output of the predetermined tap signals of the forward equalizer. The forward equalizer is controlled in accordance with the channel response to effectively achieve adaptive equalization.

8 Claims, 9 Drawing Sheets

DECISION FEEDBACK EQUALIZER INCLUDING FORWARD PART WHOSE SIGNAL REFERENCE POINT IS SHIFTABLE DEPENDING ON CHANNEL RESPONSE

BACKGROUND OF THE INVENTION

1. Field of the Invention

The present invention relates to a decision feedback equalizer for equalizing waveform distortion caused by multipath fading in a digital radio communications system. More specifically, the present invention relates to a decision feedback equalizer which includes a forward part whose signal reference point is shifted in accordance with variations of channel response. The present invention is able to attain effective removal of waveform distortion due to severe multi-path fading of multi-level quadrature amplitude modulation (QAM) signal.

2. Description of the Prior Art

A digital radio transmission is susceptible to multipath fading or the like and invites waveform distortion of the transmitted signal resulting in degradation of signal quality. In order to minimize this problem, it is the current practice to employ an automatic adaptive equalizer using a transversal filter. An adaptive equalizer may be classified into linear and non-linear types.

Before discussing the embodiments of the present invention in detail, known techniques for adaptive equalization for minimizing waveform distortion caused by multipath fading will be discussed with reference to FIGS. 1 to 4.

FIG. 1 shows a known linear equalizer in block diagram form. As shown, this arrangement includes a (2N+1)-tapped transversal filter 10 (N is a positive integer), a decision circuit 12 and a subtractor 14. A tap control signal generator 16 forms part of the transversal filter 10. As shown, the filter 10 includes a plurality of tapped delay circuits or shift registers 18 which are coupled in series and each of which has a symbol period T. The transversal filter 10 further comprises a plurality of multipliers 20 and an adder 22. Tap signals $u_N, \ldots, u_0, \ldots,$ and $u_{-N}$ dispersed on a plurality of taps are respectively multiplied by corresponding tap coefficients $c_{-N}, \ldots, c_0, \ldots$ and $c_N$. The outputs of the multipliers 20 are added at the adder 22. An error siganl $\epsilon$ is obtained at the subtractor 14 by subtracting the output from the decision circuit 12 from the input thereto. The tap control signal generator 16 is supplied with the error signal $\epsilon$ and issues a plurality of tap control signals $c_{-N}, \ldots, c_0, \ldots$ and $c_N$ by minimizing the mean square of the error signal $\epsilon$. Since the linear equalizer shown in FIG. 1 is well known in the art, further description thereof will be omitted for brevity.

Throughout the instant specification, merely for the convenience of description, a tap coefficient and the tap corresponding thereto are denoted by the same reference numeral.

The above-mentioned linear equalization has found extensive use in terrestrial digital microwave communications systems. However, it is unable to effectively minimize deep or severe multipath distortion. Therefore, residual intersymbol interference undesirably increases. In particular, as a signal transmission rate becomes higher and signal propagation distance increases, the linear equalization is no longer sufficient to handle severe frequency selective fading wherein multipath delay spreads over a transmission symbol period.

FIG. 2 is a block diagram showing a non-linear type equalizer which takes the form of a decision feedback equalizer (DFE) denoted by reference numeral 30. The known decision feedback equalizer 30, illustrated in FIG. 2, will be discussed in detail with reference to FIG. 5 which shows a first embodiment of the present invention. Accordingly, a detailed description of the DFE 30 will not be made at this time.

The DFE shown in FIG. 2 includes a forward equalizer (FE) 32 and a backward equalizer (BE) 34. A center tap $c_0$ of the overall DFE 30 is positioned at the final tap of the forward equalizer as shown. The forward equalizer 30 includes $N-1$ delay circuits 36 coupled in series, N multipliers 38 and an adder 40. On the other hand, the backward equalizer 34 is provided with M delay circuits 42, M multipliers 44 and an adder 46. Further, the DFE 30 includes a decision circuit 48, two subtractors 50, 52, and a tap control signal generator 54.

The DFE 30 is supplied with an incoming QAM signal (for example) and operates to minimize intersymbol interference (ISI) due to a precursor of an impulse response at the forward equalizer 32, while minimizing ISI caused by a postcursor at the backward equalizer 34. The output of the forward equalizer 32 is subtracted from the output of the backward equalizer 34 at the subtractor 50. The decision signal $a_n$ outputted from the decision circuit 48 and then fed back to the backward equalizer 34, is free of intersymbol interference and noises. Therefore, the equalization capability of the backward equalizer 34 using the decision feedback technique, is higher than that of the forward equalizer 32. This means that the backward equalizer 34 is capable of completely removing ISI caused by a postcursor of impulse response (viz., minimum phase shift fading). It goes without saying that the DFE 30 is superior to the case where only the forward equalizer 32 is provided which has the same function as the linear equalizer 10 shown in FIG. 1.

On the other hand, intersymbol interference due to a precursor (non-minimum phase shift fading) is equalized at the forward equalizer 32 whose function equals that of the linear equalizer 10 shown in FIG. 1. Consequently, in connection with the ISI due to non-minimum phase shift fading, the DFE 30 implements merely equalization which is identical to that of the forward equalizer 32. This is the reason why a easily installed linear equalizer 10 (or 32) is chiefly employed rather than a complex DFE in terrestrial digital microwave communications systems wherein severe distortion due to non-minimum phase fading occurs frequently.

A known approach to effectively removing intersymbol interference caused by non-minimum phase shift fading, is to provide a matched filter (MF) which is followed by a decision feedback equalizer (DEF) as shown in FIG. 2. The MF/DEF reception technique was proposed by Kojiro Watanabe in a paper in Japanese (CS78-203) entitled "Adaptive matched filter and its significance to anti-multipath fading", Feb. 22, 1979, presented at the Electronic Communications Association. The paper discloses adaptive signal reception by maximizing a signal-to-noise (SN) ratio together with equalization of distortion through the use of the DFE, thus improving the equalization capability of the DFE of intersymbol interference due to non-minimum phase shift fading. The paper further discusses a number of advantages derived from the usage of the matched filter.

FIG. 3 is a block diagram showing one example of the above-mentioned MF/DEF arrangement. The decision feedback equalizer (DFE) 30, which is identical to the arrangement illustrated in FIG. 2, is preceded by a matched filter 60 which includes a plurality of delay circuits 62 each having a symbol interval T/2, a plurality of multiplexers 64, and a tap control signal generator 68. As is well known, a matched filter maximizes the output ratio of peak signal power to mean noise power.

Response of a matched filter will briefly be described with reference to FIG. 4. A waveform (A) shown in FIG. 4 represents the impulse response before being processed by the matched filter (MF) 60, while a waveform (B) denotes impulse response of the MF 60. Since the matched filter 60 makes symmetrical the impulse response about a reference response point, a strong precursor in the range of $t<0$ is partly converged to the reference response and the precursor component energy is dispersed over a range of $0<t$. Therefore, part of the precursor distortion due to the non-minimum phase fade is transferred to the postcursor distortion. This means that the forward equalizer 32 is able to lessen the burden thereon for equalizing the precursor distortion and the increased postcursor distortion is equalized at the backward equalizer 34. Accordingly, the overall equalization capability of the DFE 30 can be improved in connection with the precursor distortion equalization. It is understood that the MF/DFE exhibits an effective equalization capability against the precursor distortion relative to the arrangement consisting of the DEF only.

However, the above-mentioned MF/DFE is directed to maximization of a limited SN ratio using diversity techniques in an over-the-horizon digital communications system, and hence is unsuitable for a communications system wherein waveform distortion should effectively be equalized but a SN ratio is relatively high.

As mentioned previously, the MF/DFE exhibits excellent precursor distortion equalization performance as compared with the case where the DFE only is provided. However, the MF/DFE is inferior to the DFE in connection with the equalization of the postcursor distortion. This problem, inherent in the MF/DFE, is caused by new waveform distortion introduced by the provision of the MF 60 and is noticeable in the case of multi-level QAM system. This problem is enhanced with increase in the number of levels of QAM. More specifically, the impulse response undergoing the matched filtering converges at the reference position at $t=0$, but there exists the impulse response which disperse over a relatively wide range although the levels are low. In order to equalize such widely dispersed impulse responses, the number of taps of the MF should be increased to a considerable extent. However, this solution is very difficult or impossible to practically implement.

SUMMARY OF THE INVENTION

It is an object of the present invention to provide an improved decision feedback equalizer which comprises a forward equalizer whose center tap is shifted by at least one symbol interval towards the final stage of the equailier.

In brief, the above objects is achieved by an arrangement wherein a center tap of a transversal filter, which forms part of a forward equalizer, is shifted by at least one symbol interval. An error signal is generated using a decision output and tap outputs of the forward and backward equalizers. An impulse response estimation circuit is provided to receive the decision output of the predetermined tap signals of the forward equalizer. The forward equalizer is controlled in accordance with the channel response to effective achieve adaptive equalization.

More specifically a first aspect of the present invention comes in a decision feedback equalizer, comprising: first means, said first means implementing linear equalization for an incoming signal, said first means including a transversal filter whose center tap is shifted by at least one symbol interval from a tap provided for the last stage of said transversal filter; second means, said second means implementing non-linear equalization for a signal applied thereto; third means, said third means coupled to receive outputs of said first and second means and generating a difference between the outputs of said first and second means; fourth means, said fouth means coupled to receive the output of said third means, said fourth means issuing a first error signal and a decision signal; fifth means, said fifth means coupled to receive said decision signal and coupled to receive signals appearing on said center tap and a tap provided in said last stage of said transversal filter, said fifth means correlating the received signals and monitoring a main response of channel impulse response and a precursor; sixth means, said sixth means receiving signals from said first and second means and also receiving said decision output, said sixth means performing subtraction and generating a second error signal; wherein said fifth means change the distortion equalizing algorithm in accordance with the signals received.

BRIEF DESCRIPTION OF THE DRAWINGS

The features and advantages of the present invention will become more clearly appreciated from the following description taken in conjunction with the accompanying drawing in which like blocks are denoted by like reference numerals and in which.

DETAILED DESCRIPTION OF THE PREFERRED EMBODIMENTS

Figure 5:
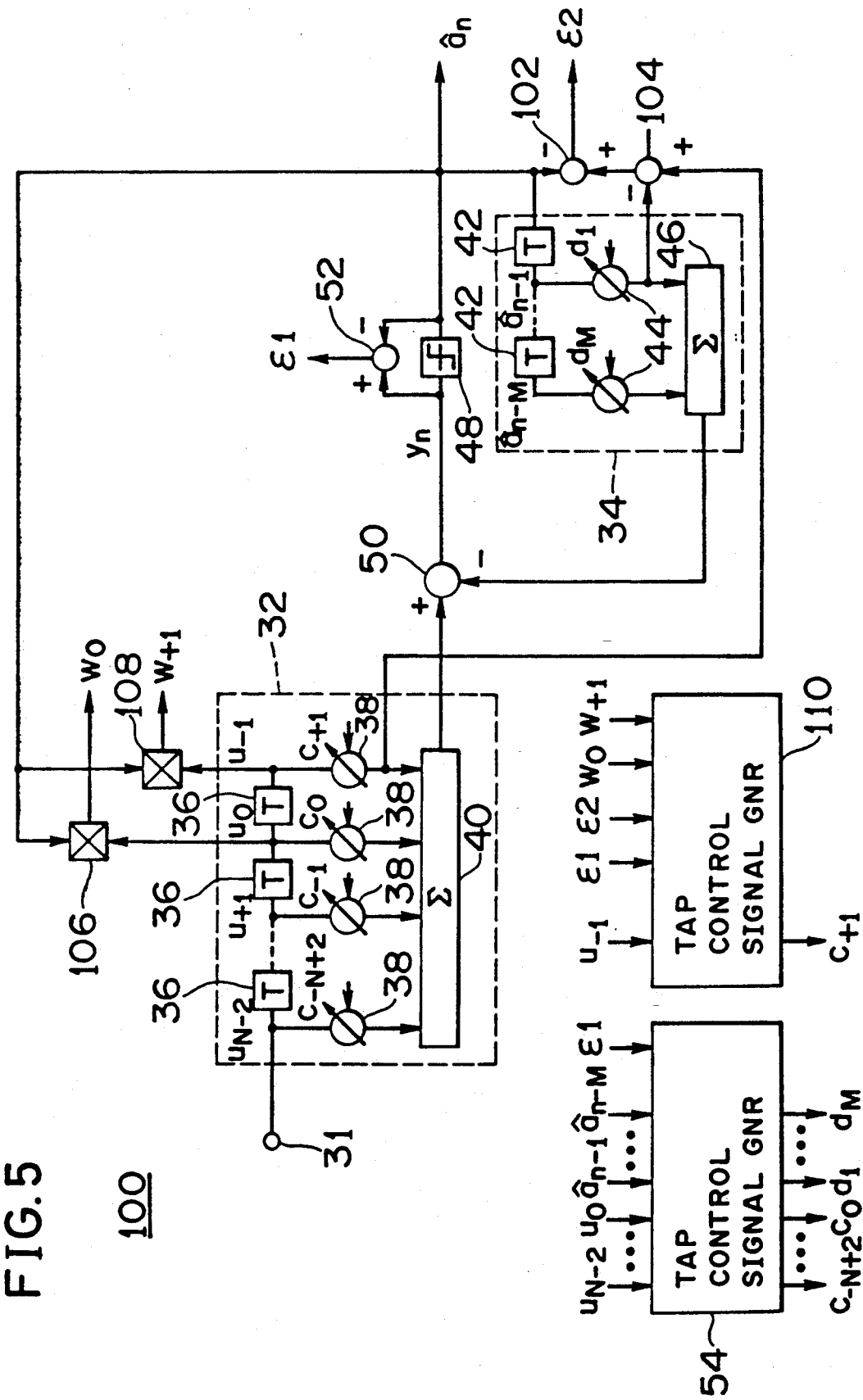
FIG. 5 is a block diagram showing a first embodiment of the present invention.

Reference is now made to FIG. 5, wherein the first embodiment of the present invention is illustrated in block diagram form.

Figure 1:
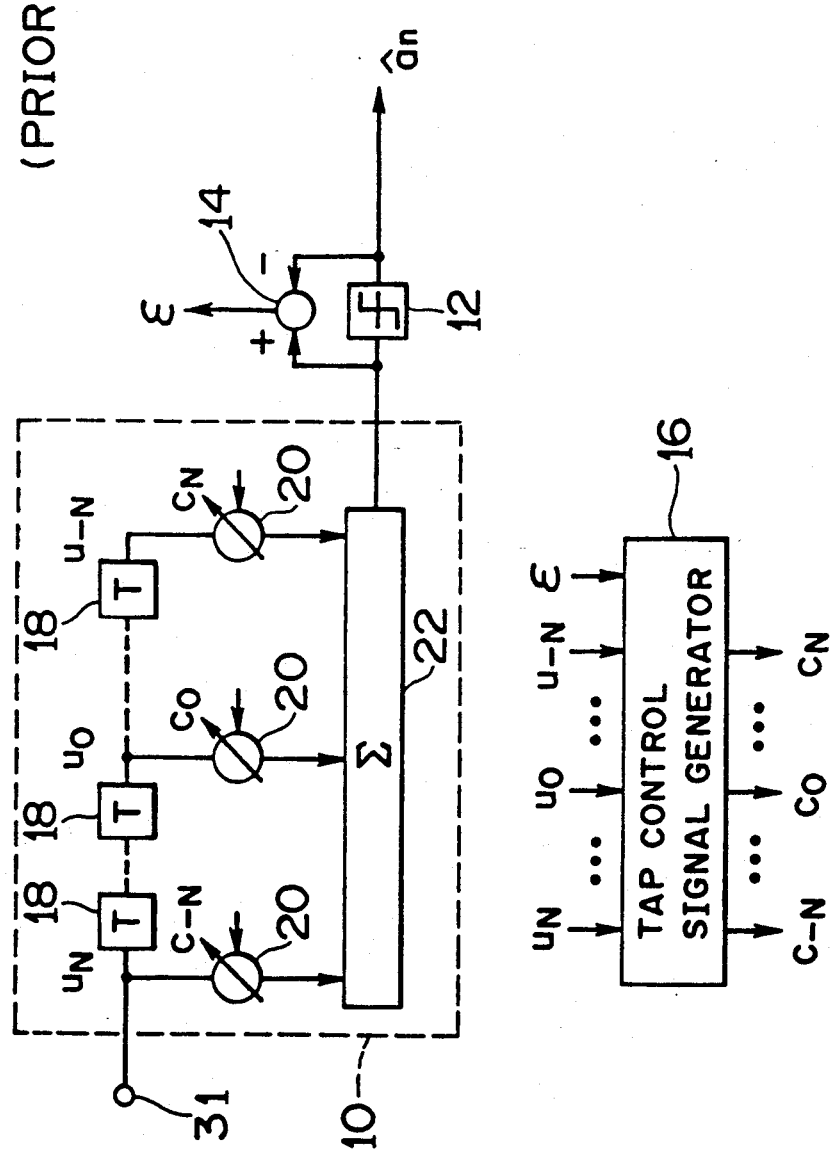
FIG. 1 is a block diagram showing a known linear equalizer referred to in the opening paragraphs of the instant specification.
Figure 2:
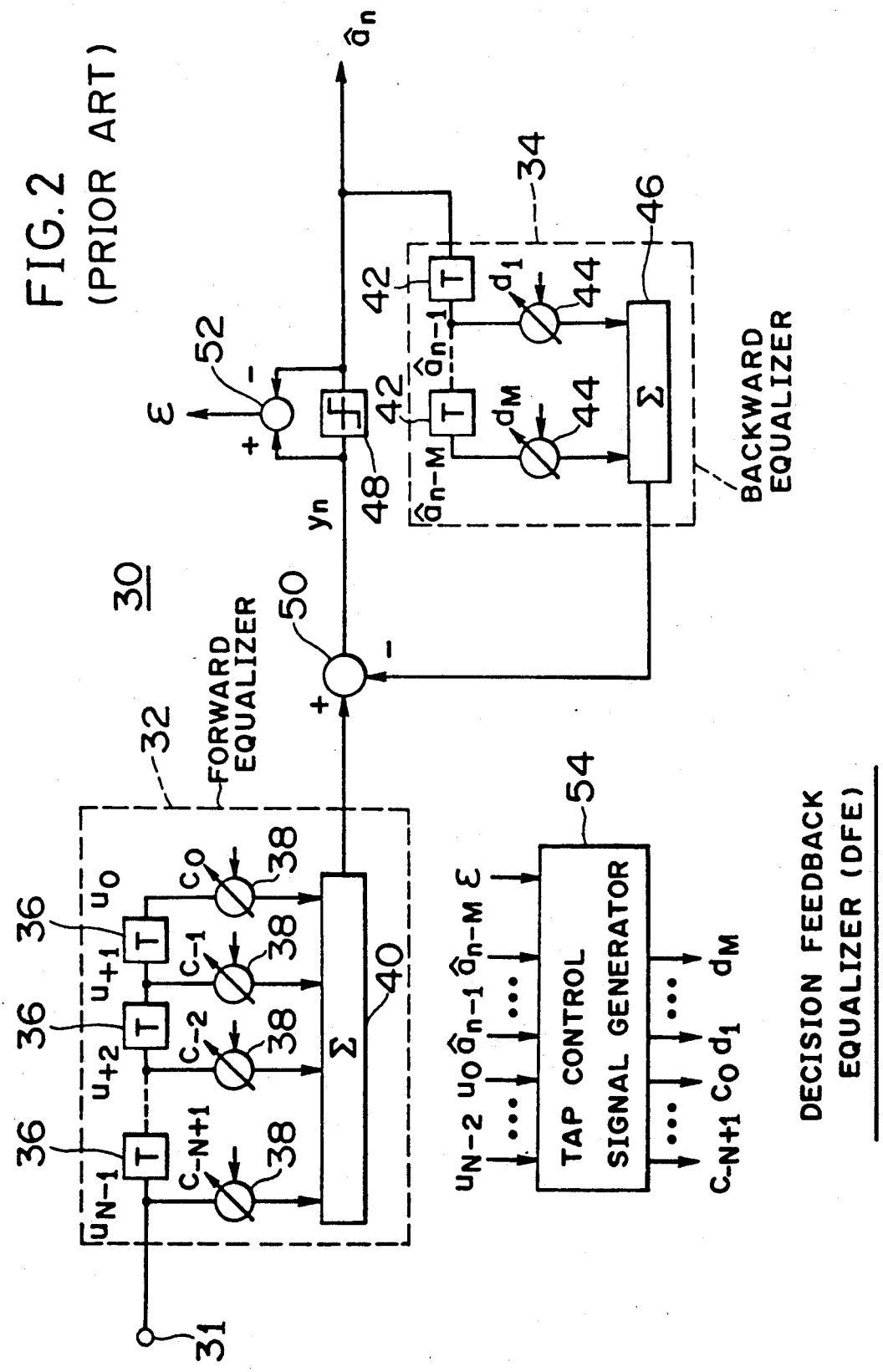
FIG. 2 is a block diagram showing a known decision feedback equalizing arrangement including a forward equalizer and a backward equalizer, discussed in the opening paragraphs of the instant specification.
Figure 3:
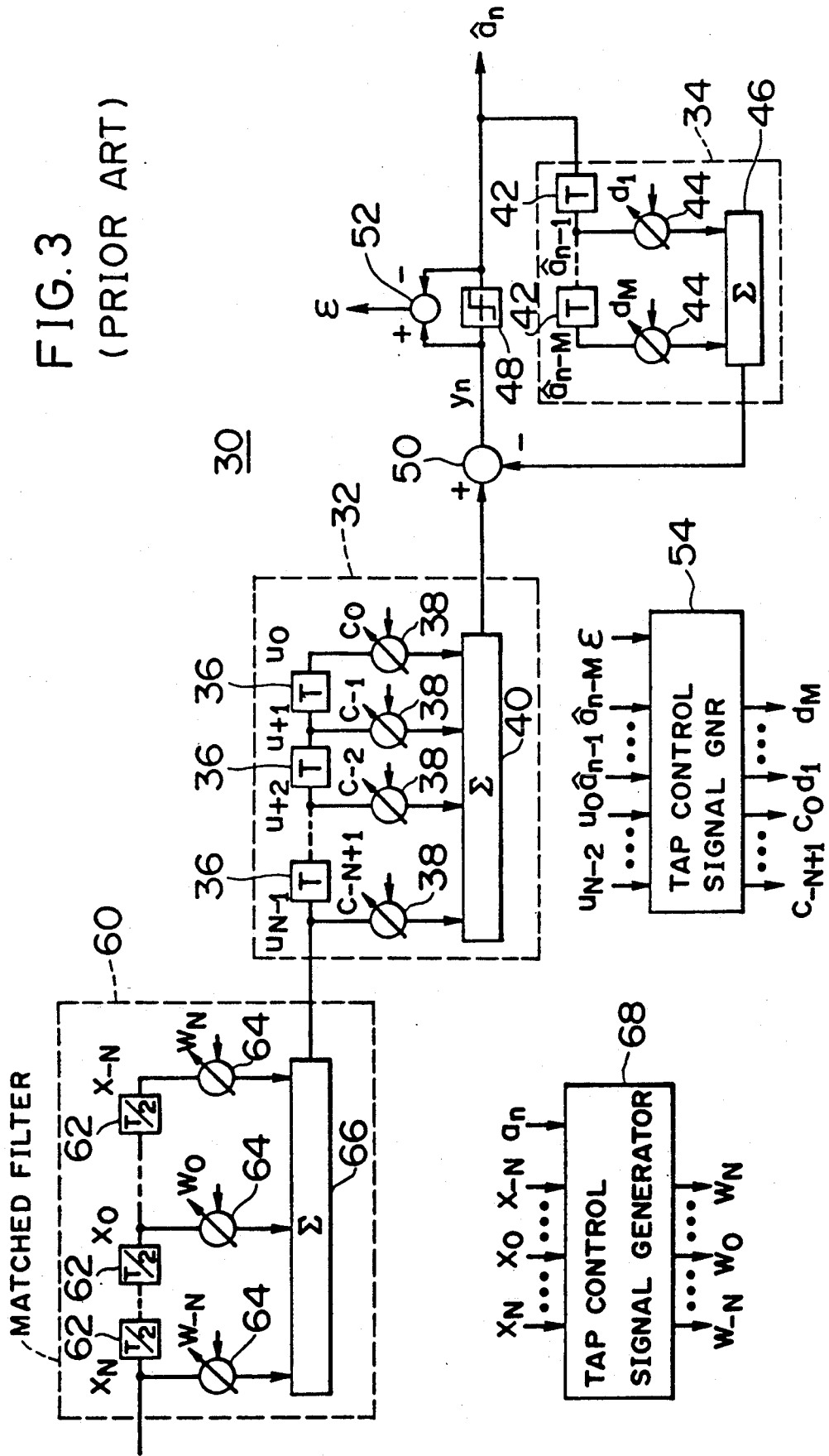
FIG. 3 is a block diagram showing a known equalizing arrangement comprising a combination of a matched filter and the decision feedback equalizing arrangement shown in FIG. 2, the arrangement of FIG. 3 having been described in the opening paragraphs of the instant specification.
Figure 4:
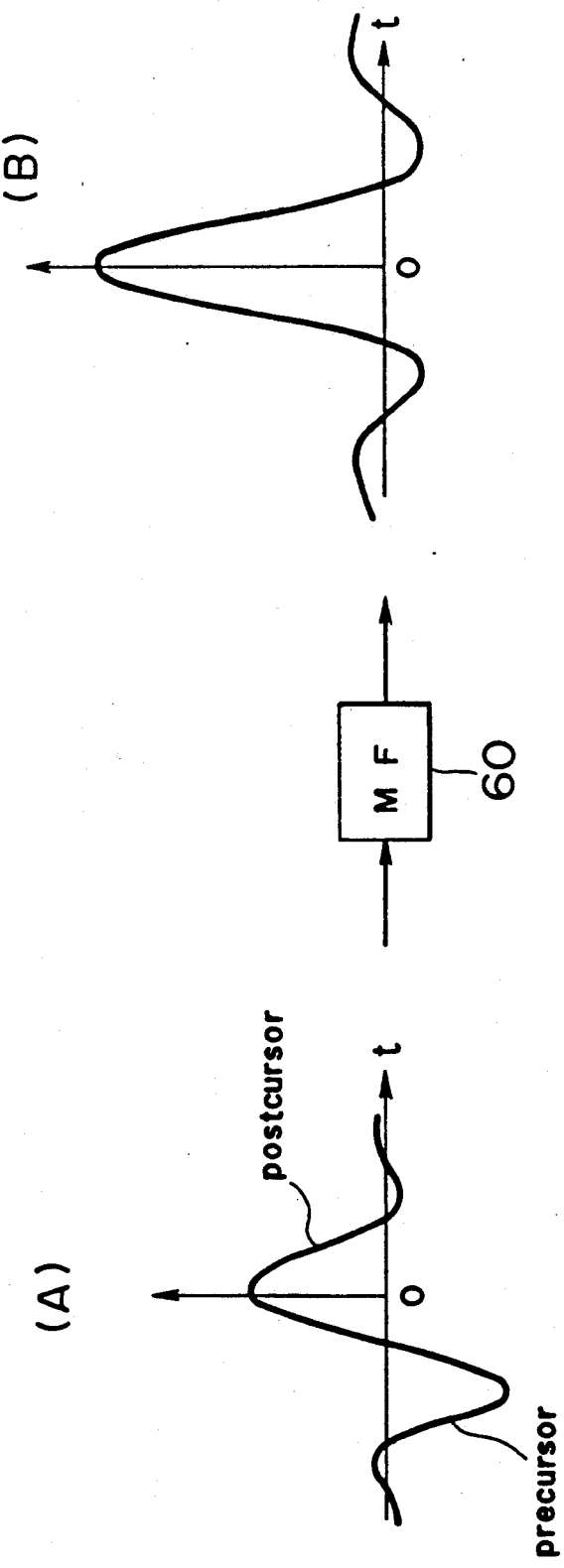
FIG. 4 are graphs for clarifying the operation of the matched filter illustrated in FIG. 3.

The arrangement shown in FIG. 5, which is denoted by reference numeral 100, differs from that shown in FIG. 2 in that: (a) the former arrangement further comprises two subtractors 102, 104, two correlators 106, 108, and a tap control signal generator 110, and in that (b) the center tap $c_0$ of the former arrangement is one-tap shifted towards the input thereof and hence the last tap is denoted by $c_{+1}$.

Designating a transmitted symbol sequence by $a_n$ ($n = -\infty \ldots +\infty$) and designating discrete values of impulse response of a transmission network by $h_n$, then discrete values of a received signal are represented by $$r_n = \sum_{K=-\infty}^{+\infty} a_k h_{n-k} \tag{1}$$

The discrete values $r_n$ of the received signal are applied to the forward equalizer 32 via the input terminal 31, and are delayed by the delay circuits 36 and distributed on the taps $c_{+1}, c_0, c_{-1}, \ldots, c_{-N+2}$ as $u_{-1}, u_0, u_{+1}, \ldots, u_{N-2}$ in the order of $r_{n-1}, r_n, \ldots, r_{n+N-2}$. The distributed values on the taps are multiplied by corresponding tap coefficients $c_{+1}, c_0, c_{-1}, \ldots, c_{-N+2}$ at the corresponding multipliers 38. Following this, the multiplied values are summed at the adder 40 and then applied to the subtractor 50.

The subtractor 50 issues a difference, denoted by $Y_n$, between the outputs of the two equalizers 32 and 34, and applies the same to the decision circuit 48 which is a non-linear element. The decision circuit 48 generates a decision signal (or discriminating signal) â which is applied to the backward equalizer 34. The decision signal â is delayed by a plurality of the delay circuits 42. The distributed decision signals $â_{n-1}, \ldots, â_{n-M}$ are multiplied by the corresponding tap coefficients $d_1, \ldots, d_M$ at the multipliers 44. The multiplied values are added at the adder 46 whose output is fed back to the subtractor 50. Accordingly, the signal $y_n$ is represented by $$y_n = \sum_{i=-N+2}^{+1} r_{n-i} c_i - \sum_{L=1}^{M} â_{n-L} d_L \tag{2}$$

The subtractor 52 determines the difference between the input and output of the decision circuit 48 and applies the same to the tap control signal generator 54 as a first error signal $\epsilon 1$ which is equal to the error signal $\epsilon$ in FIG. 2. The error signal $\epsilon 1$ is represented by the following equation:

$$\epsilon 1 = y_n - â_n \tag{3}$$

In order that the DFE 100 functions as an equalizer, the tap coefficients of the two equalizers 32 and 34 should be determined such that an evaluation function E1 represented by the following equation (4) is minimized as in the case of a linear equalizer (viz., Wiener filter).

$$E1 = E'[\epsilon 1^2] \tag{4}$$

wherein $[\epsilon 1^2]$ represents a mean square value of the error signal $E'[\epsilon 1^2]$. Therefore, the tap coefficients are determined by the following equations:

$$\delta E1/\delta c_i = 0 (i = -N+2, \ldots, 0, 1)$$

$$\delta E1/\delta d_L = 0 (L = 1, 2, \ldots, M)$$

Further, the optimum values of the tap coefficients are decided by the following normal equation:

$$\begin{bmatrix} A & -H \\ -H^{*T}I \end{bmatrix} \begin{bmatrix} c \\ d \end{bmatrix} = \begin{bmatrix} H_0 \\ 0 \end{bmatrix} \tag{5}$$

where
A: submatrix
*: complex congujate
T: transpose of matrix
I: unit matrix

The tap coefficients are given by the following vectors, $$c = \begin{bmatrix} c_{-N+2} \\ \vdots \\ c_0 \\ c_{+1} \end{bmatrix} \quad d = \begin{bmatrix} d_1 \\ d_2 \\ \vdots \\ d_M \end{bmatrix}$$

The left term of equation (5) with $(N+M) \times (N+M)$ size, is a correlation matrix of the overall DFE 100. Further, $$H_0 = \begin{bmatrix} h_{N+2} \\ \vdots \\ h_0 \\ h_{-1} \end{bmatrix}$$

$$H = \begin{bmatrix} h_{(N-2)+1} & \cdots & h_{(N-2)+M} \\ \vdots & & \vdots \\ h_{(0)+1} & \cdots & h_{(0)+M} \\ h_{(-1)+1} & \cdots & h_{(-1)+M} \end{bmatrix}$$

$$A = \begin{bmatrix} a_{-N+2,-N+2} & a_{-N+2,-N+3} & \cdots & a_{-N+2,1} \\ a_{-N+3,-N+2} & a_{-N+3,-N+3} & \cdots & a_{-N+3,1} \\ \vdots & & a_{ij} & \vdots \\ a_{1,-N+2} & a_{1,-N+3} & \cdots & a_{1,1} \end{bmatrix}$$

The matrix A shown above, is constructed of correlation coefficients $a_{ij}$ which is given by the following equation:

$$a_{ij} = \sum_{n=-\infty}^{+\infty} h_{n-i}^* h_{n-j} \tag{6}$$

The tap control signal generator 54 is supplied with the tap signals $u_0, \ldots, u_{N-2}$ of the forward equalizer 32, the tap signals $\hat{a}_{n-1}, \ldots, \hat{a}_{n-M}$ of the backward equalizer 34, and the error signal $\epsilon 1$, and then outputs the tap coefficients $c_0, \ldots, c_{-N+2}, d_1, \ldots, d_M$ in accordance with a conventional least mean square (LMS) algorithm. More specifically, the tap coefficients are given by $$c_i^{n+1} = c_i^n - \mu \epsilon 1^n u_{-i}^{n*} (i = -N+2, \ldots, -1, 0) \quad (7)$$

$$d_i^{n+1} = d_i^n + \nu \epsilon 1^n \hat{a}_{n-L}^{n*} (L = 1, \ldots, M) \quad (8)$$

where
$\mu$: step size parameter
$\nu$: step size parameter
superscripted (n+1) and n: time point.
The optimal values of the tap coefficients are obtained from equations (7) and (8) by setting the step parameters $\mu$ and $\nu$ within a convergent range. This means the tap coefficients can be derived without solving the normal equation (5).

The operations and algorithms thus far discussed can be applied to the arrangement shown in FIG. 2 except that the last tap coefficient $c_{+1}$ of the FIG. 5 arrangement is prepared by the tap control signal generator 110. This stems from the fact that the center tap $c_0$ of the FIG. 5 arrangement is shifted by one tap from the last stage of the forward equalizer 32.

It is known in the art that multipath fading in a typical terrestrial digital microwave communications system can be modeled on a two-path (or two-ray) type. A delay difference between the main and echo responses is usually less than one symbol interval T. The one-tap shifting of the center tap $c_0$ has been found to produce noticeable results in equalizing the precursor intersymbol interference caused by non-minimum phase fading, as compared with the known DFE illustrated in FIG. 2.

The above-mentioned advantages, derived from the one-tap shifting of the center tap $c_0$ from the final stage of the forward equalizer, can be obtained by solving the normal equation (5). This will be described in detail with reference to FIG. 6.

Figure 6:
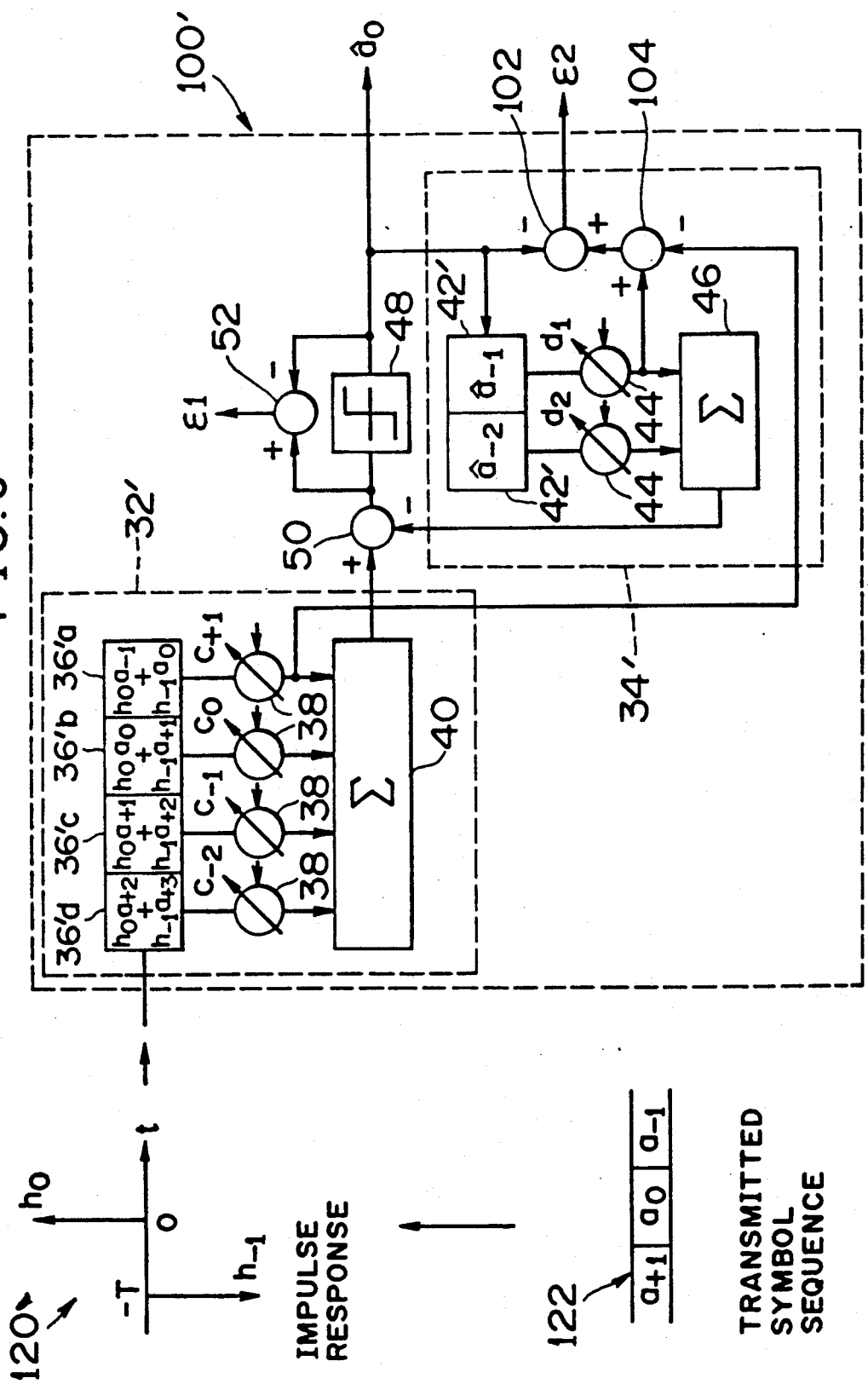
FIG. 6 is a block diagram presented for clarifying the operation of the FIG. 5 arrangement.

The arrangement shown in FIG. 6, which is denoted by reference numeral 100', is provided with a forward equalizer 32', a backward equalizer 34', the two subtractors 50 and 52, and the decision circuit 48. It should be noted that the correlators 106, 108 in FIG. 5 are omitted in that they are not concerned with the instant discussion. Further, the forward equalizer 32', which is the counterpart of the equalizer 32 (FIG. 5), is provided with four shift registers 36'a, 36'b, 36'c and 36'd (instead of the delay circuits 36). Still further, the backward equalizer 34' includes two shift registers 42'a and 42'b in lieu of the delay circuits 42.

In FIG. 6, it is assumed that the DFE shown in FIG. 6 is coupled to transmission paths having a very severe impulse response 120. The impulse response 120 has a main response $h_0$ and precursor $h_{-1}$ which are in an inverse phase relationship with each other. The precursor $h_{-1}$ has an amplitude approximately equal to that of the main response $h_0$ at a time point $t = -T$. This model exhibits a deep notch in the carrier frequency and invites severe distortion in the received signal. A transmitted symbol sequence $a_n$ (n=0, ±1, ±2, ...), denoted by reference numeral 122, is convoluted by the impulse response 120 and then is applied to the forward equalizer 32'. When the decision circuit 48 generates an output $\hat{a}_0$, the received signal $r_0$ on the tap $c_0$ (viz., the shift register 36'b) is represented by $(h_0 a_0 + h_{-1} a_{+1})$ wherein (a) $h_0 a_0$ is a desirable signal component of the main response $h_0$ and (b) $h_{-1} a_{+1}$ is intersymbol interference due to the precursor $h_{-1}$. As shown, the received signal is distributed on the other taps (viz., the shift registers 36'a, 36'c and 36'd) as $(h_0 a_{-1} + h_{-1} a_0)$, $(h_0 a_{+1} + h_{-1} a_{+2})$ and $(h_0 a_{+2} + h_{-1} a_{+3})$, respectively.

It is assumed that when the center tap $c_0$ is located at the final tap of the forward equalizer 32' as in the conventional DFE (FIG. 2), it is practically impossible that the known DFE completely removes the intersymbol interference in the presence of such a severe precursor as shown in FIG. 6. That is to say, under such very strict circumstances, the known DFE is no longer able to implement equalization as the known non-linear equalizer. In order to comply with such severe impulse response, the known DFE requires infinite number of taps, which is practically impossible. The above-mentioned discussion will be understood by those skilled in the art, and hence further description thereof will be omitted for brevity.

As mentioned previously, the DFE 100' is provided with the forward equalizer 32' whose center tap $c_0$ is one-tap shifted from the final tap $c_{+1}$ on which the received signal component $r_{-1}$ (= $h_0 a_{-1} + h_{-1} a_0$) is present. For the convenience of discussion, it is assumed that $h_0 = 1.00$ and $h_{-1} = -0.99$ in the FIG. 6 arrangement. By solving the normal equation (5), we get the following values of $c_0, c_{-1}, c_{-2}, d_2, c_{+1}$ and $d_1$:
$c_0, c_{-1}, c_{-2}, d_2$ each assuming approximately zero
$c_{+1} = -1.01$
$d_1 = -1.01$
Therefore, the output of the forward equalizer 32' is represented by $$\begin{aligned} c_{+1} r_{-1} &= c_{+1}(h_0 a_{-1} + h_{-1} a_0) \\ &= -1.01(1.0 a_{-1} - 0.99 a_0) \\ &= -1.01 a_{-1} + a_0 \end{aligned}$$

On the other hand, the output $(d_1 \hat{a}_{-1})$ of the backward equalizer 34' is $-1.01 \hat{a}_{-1}$. If the decision output $\hat{a}_{-1}$ is correct, $\hat{a}_{-1}$ can be approximated by $a_{-1}$. Therefore, the intersymbol interference due to $a_{-1}$ can be removed by assuming the difference between the outputs of the forward and backward equalizers 32' and 34'. It follows that the decision circuit 48 is supplied with the signal component $a_0$ only and hence the decision by the circuit 48 is performed correctly.

In summary, in the event of the severe precursor intersymbol interference, the signal component $a_0$ involved in $h_{-1} a_0$ appearing on the final tap $c_{+1}$ is applied to the decision circuit 48 by removing the signal component $a_{-1}$ using the subtractor 50. On the contrary, in the case where the postcursor distortion is to be equalized, the first embodiment shown in FIGS. 5 and 6 is adjusted or controlled such that the tap coefficient for the center tap $c_0$ becomes dominant.

The discussion thus far is that the arrangement shown in FIG. 5 exhibits an excellent equalization capability with the severe precursor distortion by solving the normal equation (5). However, in the following, it will be explained how the tap coefficients of the arrangement shown in FIG. 6 are unable to converge if a known LMS algorithms is employed.

When the backward equalizer 34' is in the non-working condition, the tap $c_{+1}$ of the forward equalizer 32' operates to equalize the intersymbol interference caused by the signal component $a_{-1}$. On the other hand, while the backward equalizer 34' works, the tap $d_1$ operates to equalize the intersymbol interference due to the signal component $a_{-1}$. This means that the taps $c_{+1}$ and $d_1$ are equalizing the same distortion caused by $a_{-1}$. In other words, in terms of time domain, the tap $d_1$ corresponds to the tap $c_{+1}$ in connection with the center tap $c'0$.

In the decision feedback equalizer wherein the center tap is shifted, a correlation matrix for the forward equalizer's tap which overlaps the backward equalizer's tap in terms of time domain, has an eigenvalue which approaches to zero. This will be discussed in the following.

Solving the normal equation (5), we obtain $$d = H^T \cdot c \qquad (9)$$

$$\Phi \cdot c = H_0 \qquad (10)$$

where $\Phi$ is a correlation matrix in (N×N) size for the forward equalizer having N taps, and is represented by $$\Phi = A - HH^T \qquad (11)$$

A diagonal component $a_{ii}$ ($i = -N+2, \ldots, 1$) is an autocorrelation coefficient, and is a real number which is represented by $$a_{ii} = \sum_{n=-\infty}^{+\infty} h_n h_n^* \qquad (12)$$

The diagonal component $a_{ii}$ assumes the same value irrespective of "i", and has a value which depends on the main response $h_0$ of impulse response and also depends on other high level responses $\ldots, h_{-2}, h_{-1}, h_1, h_2, \ldots$ in the vicinity thereof.

$\Phi$ of equation (11) is given for the DFE shown in FIG. 5 as follows:

$$\Phi = \begin{bmatrix} \phi_{-2\ -2} & \phi_{-2\ -1} & \phi_{-2\ 0} & \phi_{-2\ 1} \\ \phi_{-1\ -2} & \phi_{-1\ -1} & \phi_{-1\ 0} & \phi_{-1\ 1} \\ \phi_{-0\ -2} & \phi_{-0\ -1} & \phi_{-0\ 0} & \phi_{-0\ 1} \\ \phi_{1\ -2} & \phi_{1\ -1} & \phi_{1\ 0} & \phi_{1\ 1} \end{bmatrix}$$

$$= \begin{bmatrix} a_{-2\ -2} & a_{-2\ -1} & a_{-2\ 0} & a_{-2\ 1} \\ a_{-1\ -2} & a_{-1\ -1} & a_{-1\ 0} & a_{-1\ 1} \\ a_{-0\ -2} & a_{-0\ -1} & a_{-0\ 0} & a_{-0\ 1} \\ a_{1\ -2} & a_{1\ -1} & a_{1\ 0} & a_{1\ 1} \end{bmatrix}$$

$$= \begin{bmatrix} h_3h_3^*+h_4h_4^* & h_3h_2^*+h_4h_3^* & h_3h_1^*+h_4h_2^* & h_3h_0^*+h_4h_1^* \\ h_2h_3^*+h_3h_4^* & h_2h_2^*+h_3h_3^* & h_2h_1^*+h_3h_2^* & h_2h_0^*+h_3h_1^* \\ h_1h_3^*+h_2h_4^* & h_1h_2^*+h_2h_3^* & h_1h_1^*+h_2h_2^* & h_1h_0^*+h_2h_1^* \\ h_0h_3^*+h_1h_4^* & h_0h_2^*+h_1h_3^* & h_0h_1^*+h_1h_2^* & h_0h_0^*+h_1h_1^* \end{bmatrix}$$

In the above equation, an autocorrelation function between the taps $c_{+1}$ and $d_1$ which correspond with each other in time domain, is $\phi_{11}$ which is derived from the above equation as indicated below.

$$\phi_{11} = \ldots + h_{-2}h_{-2}^* + h_{-1}h_{-1}^* + h_2h_2^* + h_3h_3^* + \ldots$$

The auto-correlation coefficient $\phi_{11}$ contains no dominant sampled response $h_0$. Thus, the coefficient $\phi_{11}$ usually takes a very small value except that the precursor $h_{-1}$ has a large value, while the coefficient $\phi_{11}$ approaches to zero in the absence of precursor multipath distortion. On the other hand, there are an eigenvector Q and an eigenvalue matrix P in connection with the correlation matrix $\Phi$. This relationship is represented by $$\Phi \cdot Q = P \cdot Q \qquad (13)$$

where $$Q = \begin{bmatrix} q_{-2} \\ q_{-1} \\ q_0 \\ q_1 \end{bmatrix} \quad P = \begin{bmatrix} p_{-2} & 0 & 0 & 0 \\ 0 & p_{-1} & 0 & 0 \\ 0 & 0 & p_0 & 0 \\ 0 & 0 & 0 & p_1 \end{bmatrix}$$

The eigenvalue matrix P can be obtained by means of the Jacobi method, for example. If the auto-correlation coefficient is zero, the eigenvalue corresponding thereto also takes zero. As indicated above, if the coefficient $\phi_{11}$ approaches to zero, the eigenvalue $p_1$ for the tap $c_{+1}$ also approaches to zero. This phenomenon can be observed only in the case where (a) the center tap of the forward equalizer is shifted and (b) the forward equalizer's tap overlaps the backward equalizer's tap in terms of time domain.

In the event that the eigenvalue takes a small value, the tap coefficient corresponding thereto is difficult to converge. If the eigenvalue reaches zero, there is no possibility of convergence of the corresponding tap coefficient.

Designating the solution of the normal equation (10) (viz., the optimum tap coefficient vector) by $c^{opt}$, the evaluation function E1 is rewritten by $$\begin{aligned} E1 &= E\text{min} + (c - c^{opt})^T \Phi (c - c^{opt}) \\ &= E\text{min} + V^T \Phi V \\ &= E\text{min} + D^T P D \end{aligned} \qquad (14)$$

where
$V = c - c^{opt}$
Emin = minimum value of E1
D is unitary transformation of V by the eigenvalue vector Q and is represented by $Q^T V$.

It is understood that the evaluation function E1 is a quadratic equation of the eigenvalue matrix P wherein two times the value of the eigenvalue P are differential coefficients of second order. The eigenvalue P determines the quadratic shape of the evaluation function E1. As long as the optimum value $c_i^{opt}$ for the i-th tap $c_i$ exists by solving the normal equation (5), a quadratic curve obtained by the evaluation function E1 varies to minimize $Pi = 0$ toward the direction of the coefficient error axis Pi. However, as the eigenvalue in the eigenvalue matrix P becomes small, the quadratic curve changes toward a flat line. The quite small eigenvalue matrix coefficient $p_i$, nearly zero, flattens the quadratic shape in the direction of the axis Pi. In this circumstance, the tap coefficient is no longer converged by means of the LMS algorithm, and assumes the initial value thereof.

Before describing the equalization control algorithm according to the present invention, reference will be made to FIG. 7.

Figure 7:
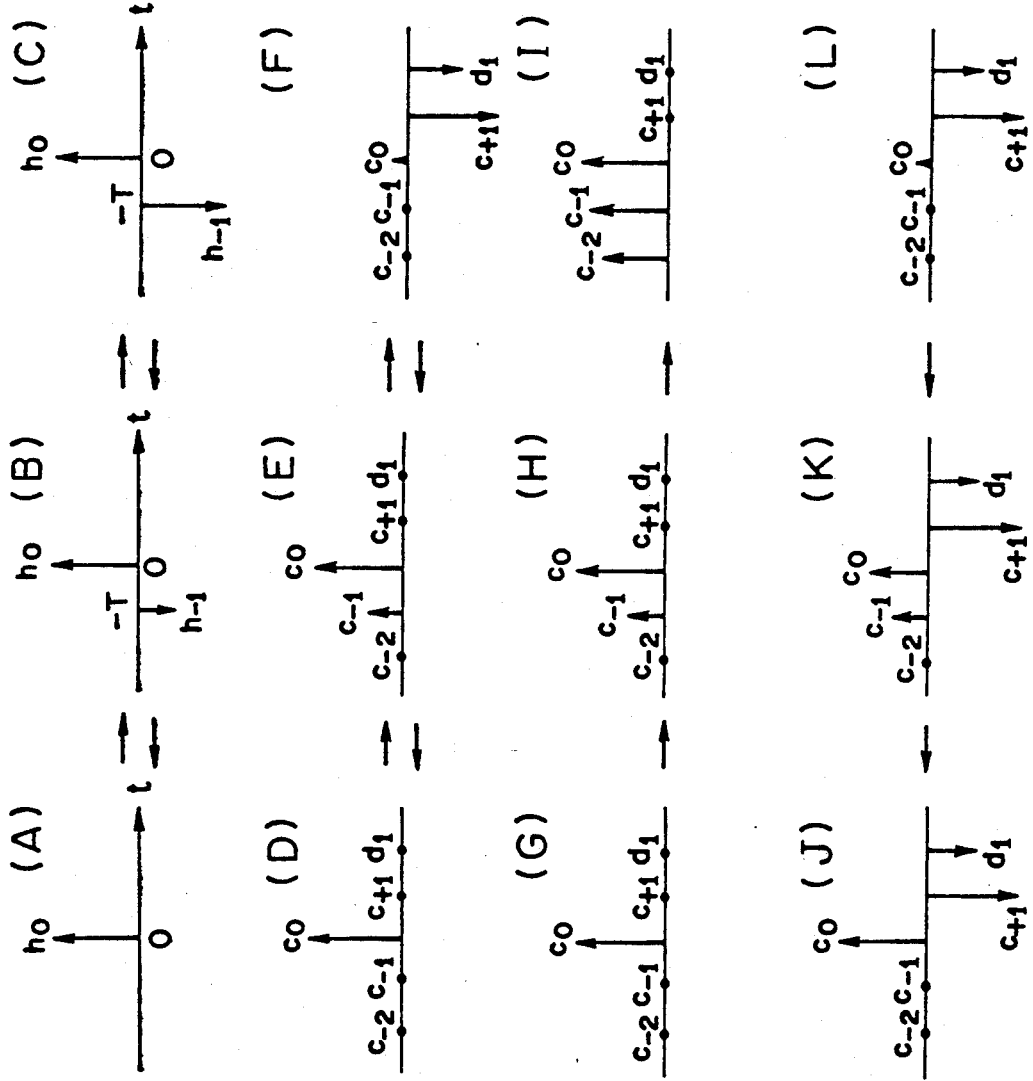
FIG. 7 are graphs for clarifying the operation of the arrangement shown in each of FIGS. 5 and 6.

FIG. 7 (A) illustrates a distortionless impulse response and hence only a main response $h_0$ exists. In this case, no equalization is required. Accordingly, the tap coefficients, which are derived from the optimum solution of the normal equation (5) in the case of FIG. 7(A), are shown in FIG. 7(D) in which case the received signal appears only on the center tap $c_0$. FIG. 7(B) shows an impulse response wherein a precursor $h_{-1}$ takes a small value. The tap coefficients, which are obtained from the optimum solution of the normal equation in the case of FIG. 7 (B), are shown in FIG. 7(E). In this case, the distortion due to the precursor $h_{-1}$ is still canceled by the tap coefficient $c_{-1}$ in the case of which the DFE operates as a linear equalizer in connection with the precursor which is smaller relative to the main response $h_0$. On the other hand, FIG. 7(C) shows a severe channel impulse response in which the precursor $h_{-1}$ grows to the same level as the main response $h_0$ with an opposite phase. The tap coefficients obtained by the optimum solution of the normal equation in the case of FIG. 7(C) are shown in FIG. 7(F). In this case, the main signal route is transferred to the tap $c_{+1}$ instead of $c_0$, and the intersymbol interference due to the precursor is equalized by using the tap coefficient d1 by the backward equalizer 34' (or 34) through the feedback algorithm.

It is assumed that the channel response varies from the distortionless state to the severely contaminated state as (A)→(B)→(C) in FIG. 7. It is further assumed that all the tap coefficients of the DFE 100 (FIG. 6) are updated using the conventional LMS algorithm and the initial tap coefficients are set as shown in FIG. 7 (D). In such a case, the tap coefficients vary as shown in (G)→(H)→(I). The eigenvalue $p_1$ of the tap $c_{+1}$ in FIG. 7 (H) is extremely small and hence maintains the value at the state of (G). This means that the distortion due to the precursor $h_{-1}$ can be equalized by the tap $c_{-1}$. On the contrary, when the precursor distortion grows as shown in FIG. 7 (C), the eigenvalue $p_1$ is much smaller than each of the eigenvalues $p_0$, $p_{-1}$ of the taps $c_0$, $c_{-1}$, respectively. Consequently, the tap coefficients $c_0$ and $c_{-1}$, converges faster than the coefficient $c_{+1}$. Thus, as shown in FIG. 7 (I), the tap $c_0$ continues to hold the received signal component $h_0 a_0$ while the tap coefficient $c_{-1}$ grows with increase of the precursor $h_{-1}$. Further, equalizing the tap coefficient $c_{-1}$ invites interference caused by a signal component $â_{+2}$, whereby the tap coefficient $c_{-2}$ grows undesirably in order to equalize $â_{+2}$. Consequently, if the DFE 100' is controlled under the conventional LMS algorithm, it operates in the same manner as the known LE (linear equalizer) and hence the tap coefficients can not converge to the optimum solutions of the normal equation.

On the contrary, it is assumed that the channel response changes from the severely distorted condition to the distortion-free state just as (C)→(B)→(A) of FIG. 7. If all the tap coefficients of the DFE 100' (FIG. 6) are updated using the conventional LMS algorithm and the initial tap coefficients are set as shown FIG. 7(F), then the tap coefficients varies as shown in (L)→(K)→(J). When the precursor $h_{-1}$ becomes smaller as shown in FIG. 7(B), the eigenvalue $p_1$ of the tap $c_{+1}$ at 7(K) becomes smaller, and therefore the tap $c_{+1}$ is unable to follow the impulse response change. Thus, the tap coefficient $c_{+1}$ maintains the value at the state of FIG. 7 (L).

The tap coefficient $c_{-1}$ having an eigenvalue larger than $c_{+1}$ is used to equalize the distortion caused by the precursor $h_{-1}$ according to the optimum solution shown in FIG. 7(E). As illustrated in FIG. 7(K), the tap coefficient $c_0$ is smaller than that of FIG. 7(E). This is because the tap coefficient $c_{+1}$ has a large value. More specifically, the tap coefficient $c_{+1}$ permits the signal component $â_0$ included in the received response component $h_{-1} â_0$ to be added to the main signal route, and hence the tap coefficient $c_0$ does not require such a large value as in the FIG. 7(E). In FIG. 7(K), the distortion due to the value of the tap coefficient $c_{+1}$ is cancelled by the tap coefficient $d_1$ which overlaps $c_{+1}$ in time domain. Finally, when the channel response becomes free of distortion as shown in FIG. 7(A), the tap coefficient $c_{-1}$ falls to zero in the absence of no anomaly due to the precursor $h_{-1}$. In this case, since the signal component $h_{-1} â_0$ supplied from the tap $c_{+1}$ becomes zero, the tap coefficient $c_0$ also reaches the normal level. However, the tap coefficients $c_{+1}$ and $d_1$ hold the same levels as in the FIG. 7(K).

The description thus far made in connection with FIG. 7 is concerned with the variations of the channel response having precursor distortion.

Contrarily, the postcursor distortions which varies as a function of time can be effectively be equalized using the conventional LSM algorithm. In this case, the backward equalizer operates while the tap coefficient(s) such as $c_{+1}$ positioned after the center tap $C_0$ remains zero, and therefore the DFE 100' (FIG. 6) functions in the same manner as the conventional one.

In the following, the algorithm according to the present invention will be discussed by which the above-mentioned problems encountered in the tap coefficient convergence in the variations of precursor distortion can be removed.

As mentioned above, in the case of the channel response variations from (B) to (C), the tap coefficients of the DFE 100' (or 100) does not converge into the optimum solutions shown in FIG. 7 (F). This is because the center tap $c_0$ is used for the main signal route and the symbol $a_0$ involved in the main or reference response $h_0 a_0$ continues to be decided in the decision circuit 48. The tap coefficients $c_{+1}$, and $d_1$, which overlap in time domain, are not independent with respect to each other, but $d_1$ is subject to $c_{+1}$. The eigenvalue of the tap coefficient $c_{+1}$ is small relative to those of the other tap coefficients, and hence, even if it deviates from the optimum value thereof, the evaluation function E1 is not affected too much. This comes from the fact that the tap coefficient $d_1$ compensates for the distortion due to the deviation in value of the tap coefficient $c_{+1}$.

In order that the main signal is shifted, from the signal component $a_0$ on the center tap $c_0$, to another $a_0$ of the tap $c_{+1}$, and then is decided in the decision circuit 48, it is necessary to introduce a new algorithm for growing or developing the tap coefficient $c_{+1}$. However, the new algorithm should not disturb the control system of the DFE. The eigenvalue of the tap coefficient $c_{+1}$ exhibits a small value, and the tap coefficient $c_{+1}$ of the optimum solution increases with increase of the precursor $h_{-1}$. Therefore, the new algorithm according to the present invention employs the second error signal $\epsilon 2$ which decreases as the tap coefficient $c_{+1}$ grows with increase of the precursor $h_{-1}$.

As illustrated in FIG. 5, the output of the tap $c_{+1}$ (viz., the output of the multiplier 38 assigned to the tap $c_{+1}$) is subtracted by the output of the tap $d_1$ at the subtractor 104, and is further subtracted by the output $\hat{a}_n$ of the decision circuit 48 at the subtractor 102. The output of the subtractor 102 is the second error signal $\epsilon 2$ which is applied to the tap control signal generator 110. The generator 110 is supplied, in addition to the second error signal $\epsilon 2$, with the received signal component $u_{-1}$, the first error signal $\epsilon 1$, and the outputs $w_0$, $w_{+1}$ of the correlators 106, 108. The tap signal control generator 110 updates every symbol interval, using the signals $u-1$ and $\epsilon 2$ inputted thereto, along with the following equation.

$$c_{+1}^{n+1} = c_{+1}^n - \mu \epsilon 2^n u_{-1}^{n*} \tag{15}$$

where $\mu$ is a step size parameter.

The second error signal $\epsilon 2$ is represented by $$\begin{aligned}\epsilon 2 &= c_{+1}(h_0 a_{-1} + h_{-1} a_0) - d_1 \hat{a}_{-1} - \hat{a}_0 \\ &= (c_{+1} h_0 - d_1) a_{-1} + (c_{+1} h_{-1} - 1) a_0\end{aligned} \tag{16}$$

If the tap coefficient $c_{+1}$ is zero, then the tap coefficient $d_1$ goes to zero. Accordingly, in this case, $\epsilon 2 = -a_0$. Since $u_{-1} = h_0 a_{-1} + h_{-1} a_0$, averaging the second term of right side of equation (16), we obtain correlation between the second error signal $\epsilon 2$ and the received signal as given in the following equation.

$$E[\epsilon 2 u_{-1}^*] = -h_{-1}$$

Accordingly, as the tap coefficient $c_{+1}$ is updated every symbol interval using equation (15), even if the initial value of the tap coefficient $c_{+1}$ is zero, the tap coefficient $c_{+1}$ begins to increase with increase of the precursor $h_{-1}$. When the tap coefficient $c_{+1}$ begins to take a non-zero value, the received signal component $a_{-1}$ is introduced as an intersymbol interference against $a_0$ by the tap coefficient $c_{+1}$, and hence the backward equalizer 34 (34") begins to cancel this additional distortion. Therefore, the first term of the second line of equation (16) approaches to zero. Even if the tap coefficient $c_{+1}$ has not a sufficiently large value, the second term of the second line of equation (16) has a non-zero value. By decreasing this value gradually, it is possible to make eventually the tap $c_{+1}$ the main signal route.

The algorithm of equation (15) is different from the conventional LMS algorithm in that the first error signal $\epsilon 1$ derived from the decision circuit 48 is not employed. The algorithm using the second error signal $\epsilon 2$ updates or controls the tap coefficient $c_{30\,1}$ in such a manner that the following mean-squared value of $\epsilon 2$ is minimized.

$$E2 = E[\epsilon 2^2] \tag{17}$$

The evaluation function $E2$ of equation (17) can be represented by $$E2 = c_{+1} \Sigma h_n h_n^* - 2 c_{30\,1}(d_1 h_0 + h_{-1}) + (d_1^2 + 1) \tag{18}$$

Accordingly, the tap coefficient $c_{+1}$ which minimizes $E2$ is determined, using $\delta E2/\delta c_{+1} = 0$, by $$c_{+1} = (h_{-1} + d_1 h_0)/\Sigma h_n h_n^* \tag{19}$$

Equation (19) indicates that the tap coefficient $c_{+1}$ increases with increase of the precursor $h_{-1}$.

In the event that the error signal $\epsilon 2$ is used to update the tap coefficient $c_{+1}$, the evaluation function $E1$ of equation (4) is subject to the signal value on the tap $c_{+1}$. More specifically, while the tap $c_{+1}$ is controlled by the algorithm derived from equation (15), all the tap coefficients besides $c_{+1}$ are controlled by the LMS algorithm. As a consequence, in this case, $\delta E1/\delta c_{+1}$ is not equal to zero, and the terms related to the tap coefficient $c_{+1}$ of equation (5) are deleted. While the tap coefficient $c_{+1}$ of the FIG. 6 arrangement is updated using the second error signal, the correlation function of the tap coefficients except for $c_{+1}$ takes the form of a correlation matrix in size of $5 \times 5$, and this correlation function is represented using equations (19) and (5) by the following equation.

$$\begin{bmatrix} A & -G \\ -G^{*T} & B \end{bmatrix} \begin{bmatrix} c \\ d \end{bmatrix} = [F] \tag{20}$$

where $$c = \begin{bmatrix} c_{-2} \\ c_{-1} \\ c_0 \end{bmatrix} \quad d = \begin{bmatrix} d_1 \\ d_2 \end{bmatrix}$$

$$A = \begin{bmatrix} a_{-2-\bar{F}-2-\bar{F}-2\,0} \\ a_{-1-\bar{F}-1-\bar{F}-1\,0} \\ a_{0-2}\ a_{0-1}\ a_{0\,0} \end{bmatrix}$$

$$G = \begin{bmatrix} (h_3 - a_{-2\,1} h_0^*/a_{0\,0}) h_4 \\ (h_2 - a_{-1\,1} h_0^*/a_{0\,0}) h_3 \\ (h_1 - a_{0\,0} h_0^*/a_{0\,0}) h_2 \end{bmatrix}$$

$$B = \begin{bmatrix} (1 + (h_0 h_0^* - h_0^* h_0^* - h_0 h_0)/a_{0\,0}) & (-h_1 h_0/a_{0\,0}) \\ (-h_1^* h_0^*/a_{0\,0}) & 1 \end{bmatrix}$$

$$F = \begin{bmatrix} h_2 - a_{-2\,1} h_{-1}^*/a_{0\,0} \\ h_1 - a_{-1\,1} h_{-1}^*/a_{0\,0} \\ h_0 - a_{0\,1} h_{-1}^*/a_{0\,0} \\ (h_0^* h_{-1}^* - h_0 h_{-1}^* + h_{-1} h_0)/a_{0\,0} \\ h_1^* h_{-1}^*/a_{0\,0} \end{bmatrix}$$

If the $h_0$ and $h_{-1}$ of the impulse response 120 in FIG. 6 are 1.0 and $-0.99$, respectively, then equation (20) is $$\begin{bmatrix} 1.98 & -0.99 & 0.00 & 0.00 & 0.00 \\ -0.99 & 1.98 & -0.99 & 0.00 & 0.00 \\ 0.00 & -0.99 & 1.98 & -0.50 & 0.00 \\ 0.00 & 0.00 & -0.50 & 0.50 & 0.00 \\ 0.00 & 0.00 & 0.00 & 0.00 & 1.00 \end{bmatrix} \begin{bmatrix} c_{-2} \\ c_{-1} \\ c_0 \\ d_1 \\ d_2 \end{bmatrix} = \begin{bmatrix} 0.00 \\ 0.00 \\ 0.50 \\ -0.50 \\ 0.00 \end{bmatrix} \tag{21}$$

The eigenvalues of the left side of equation (21) are as follows:

$p-2 = 2.39,\ p-1 = 1.98,\ p0 = 1.98,$ $p1 = 0.50,\ p2 = 1.00$

None of the above eigenvalues are zero. Accordingly, each tap of equation (21) converges into the following solution thereof under the LMS algorithm using the first error signal $\epsilon 1$.

$$\begin{bmatrix} c_{-2} \\ c_{-1} \\ c_0 \\ d_1 \\ d_2 \end{bmatrix} = \begin{bmatrix} 0.00 \\ 0.00 \\ 0.00 \\ -1.00 \\ 0.00 \end{bmatrix} \qquad (22)$$

On the other hand, since the tap coefficient $c_{+1}$ is given by equation (19), substituting the tap coefficient $d_1$ by $-1.0$, $c_{+1} = -1.0$ is obtained. This result is approximately equal to the solution of the normal equation (5) when $\delta E1/\delta c_{+1} = 0$ is satisfied with the DFE 100' of FIG. 6. In other words, even if the tap coefficient $c_{+1}$ is updated using the second error signal $\epsilon 2$, the first error signal $\epsilon 1$ is not adversely affected or not disturbed and there exists a solution to be minimized. This solution can be approximated by the solution of the normal equation (5) only in terms of the first error signal $\epsilon 1$.

The above discussion is concerned with the case wherein the optimum solution of the normal equation (5) is approximately equal to the solution of equations (19) and (20) each of which is obtained from the second error $\epsilon 2$. This approximate coincidence of the solutions is derived under the case where the precursor $h_{-1}$ increases. Thus, there are cases where the solution coincidence can not be obtained. In such case, the tap coefficient $c_{+1}$ is brought into convergence to the approximate solution given by equations (19) and (20) by the adaptive algorithm (first algorithm) using equation (16) which includes the second error signal $\epsilon 2$. Following this, the tap coefficient $c_{+1}$ is updated or controlled by the another adaptive algorithm (second algorithm) using the first error signal $\epsilon 1$ (equation (7) for example).

The switching over between the first and second algorithm may invite discontinuity in the adaptive operation. However, the adjusting value Viz., step size parameter of each of the tap coefficients is usually sufficiently small, and the multipath fading variation speed are slow as compared with a transmission rate. As a result the adaptive operation's continuity can be maintained practically.

On the other hand, even if the precursor $h_{-1}$ is growing or continues to increase, in the event that the precursor $h_{-1}$ is small relative to a predetermined level, the solution of equation (5) approaches to the value of the tap coefficient $c_0$ where the signal main route is held to the tap $c_0$. In this case, there is no need for tap coefficient updating under the first algorithm using the second error signal. Therefore, if the precursor $h_{-1}$ exceeds a predetermined value, the algorithm using the second error signal $\epsilon 2$ is used. Following this, in the event that the precursor $h_{-1}$ is brought into a steady state, then the adaptive operating is switched back to the algorithm using the first error signal $\epsilon 1$.

When the precursor $h_{-1}$ is going to decrease, if the tap coefficient updating is performed by the algorithm using the second error signal $\epsilon 2$ of equation (15), the main signal route is fixed to the tap $c_{+1}$, resulting in the fact that the tap coefficients do not converge to the optimum solution of equation (5). In such a case, the first error signal $\epsilon 1$ is employed. Further, in order to gradually transfer the main signal route from the tap $c_{+1}$ to $c_0$ by reducing the value of the tap coefficient $c_{+1}$, the following algorithm is introduced.

$$c_{+1}{}^{n-1} = (c_{+1}{}^n = \mu \epsilon_1{}^n u_{-1}{}^{n*})(1-\mu) \qquad (23)$$

The right side of equation (23) is comprised of the conventional algorithm which employs the first error signal $\epsilon 1$ for adjusting the tap coefficient $c_{+1}$ and which is multiplied by $(1-\mu)$. Therefore, when the impulse response changes in the order of (C)→(B)→(A) as shown in FIG. 7, the tap coefficient $c_{+1}$ gradually decreases as illustrated in (I), (H) and (G). In this case, the tap coefficient $c_{+1}$ does not necessarily coincide with the optimum solution of equation (5). However, the deviation from the optimum solution can be cancelled or removed by the tap coefficient $d_1$ of the backward equalizer 34' (34), and thus does not adversely affect the equalization of the multipath distortion.

In the event that the precursor decreases and then is brought into a steady state, the second term of the right side of equation (23) (viz., $(1-\mu)$) is not multiplied. In this case, the updating of the tap coefficients is implemented by the conventional LMS algorithm which uses equation (7) including the first error signal $\epsilon 1$.

As discussed above, the DFE according to the present invention features the switching of algorithms for adaptive operation, and is required to monitor the variations of the precursor $h_{-1}$ in connection with the main response $h_0$. To this end, the two correlators 106, 108 are provided as shown in FIG. 5. When the decision output $a_n$ is $a_0$, the correlator 106 receives the decision output $\hat{a}_0$ and the tap signal $u_0$, while the correlator 108 is supplied with the decision output $\hat{a}_0$ and the tap signal $u_{-1}$. The correlators 106, 108 issue the outputs $W_0$ and $W_1$, respectively, which are applied to the tap control signal generator 110.

As referred to previously, the received signals $u_0$ and $u_{-1}$ are represented by $$u_0 = h_0 a_0 + h_{-1} a_{+1}$$

$$u_{-1} = h_0 a_{-1} + h_{-1} a_0$$

Correlating these signals and the decision signal $\hat{a}_0$, we obtain $$W_0 = |h_0|, \quad W_{+1} = |h_{-1}|$$

Thus, the main response $h_0$ of the channel impulse response and the precursor $h_{-1}$ at $t = -T$, are obtained. We can monitor the variations of the precursor $h_{-1}$ in relation to the main response $h_0$.

The tap control signal generator 110 is supplied with the inputs $u_{-1}$, $\epsilon 1$, $\epsilon 2$, $W_0$, and $W_{+1}$, and changes the algorithm in accordance the absolute values of $W_0$ and $W_{+1}$ each of which changes every symbol interval, as indicated below.

$$W_{+1n} > \beta \text{ and}$$
$$W_{+1n} > W_{+1n-1} c_{+1}{}^{n+1} = c_{+1}{}^n - \mu \epsilon 2^n u_{-1}{}^{n*} \qquad (24)$$

$$W_{+1n} < \beta \text{ and}$$
$$W_{+1n} > W_{+1n-1} c_{+1}{}^{n+1} = c_{+1}{}^n - \mu \epsilon 1^n u_{-1}{}^{n*} \qquad (25)$$

$$W_{+1n} = W_{+1}{}^{n-1} \text{ or}$$
$$W_{+1n} = 0 c_{+1}{}^{n+1} = c_{+1}{}^n - \mu \epsilon 1^n u_{-1}{}^{n*} \qquad (26)$$

$$W_{+1n} < W_{+1n-1} c_{+1}{}^{n+1} = (c_{+1}{}^n - \mu \epsilon \text{-} 1^n u_{-1}{}^{n*})(1-\mu) \qquad (27)$$

In the above equations (24) and (25), $\beta$ denotes a threshold level. When the precursor $h_{-1}$ is small relative to the main channel response $h_0$ and when the precursor $h_{-1}$ can be equalized by the ordinary algorithm, the threshold level $\beta$ is used for the main signal route not to be shifted to the tap $c_{-1}$.

Figure 8:
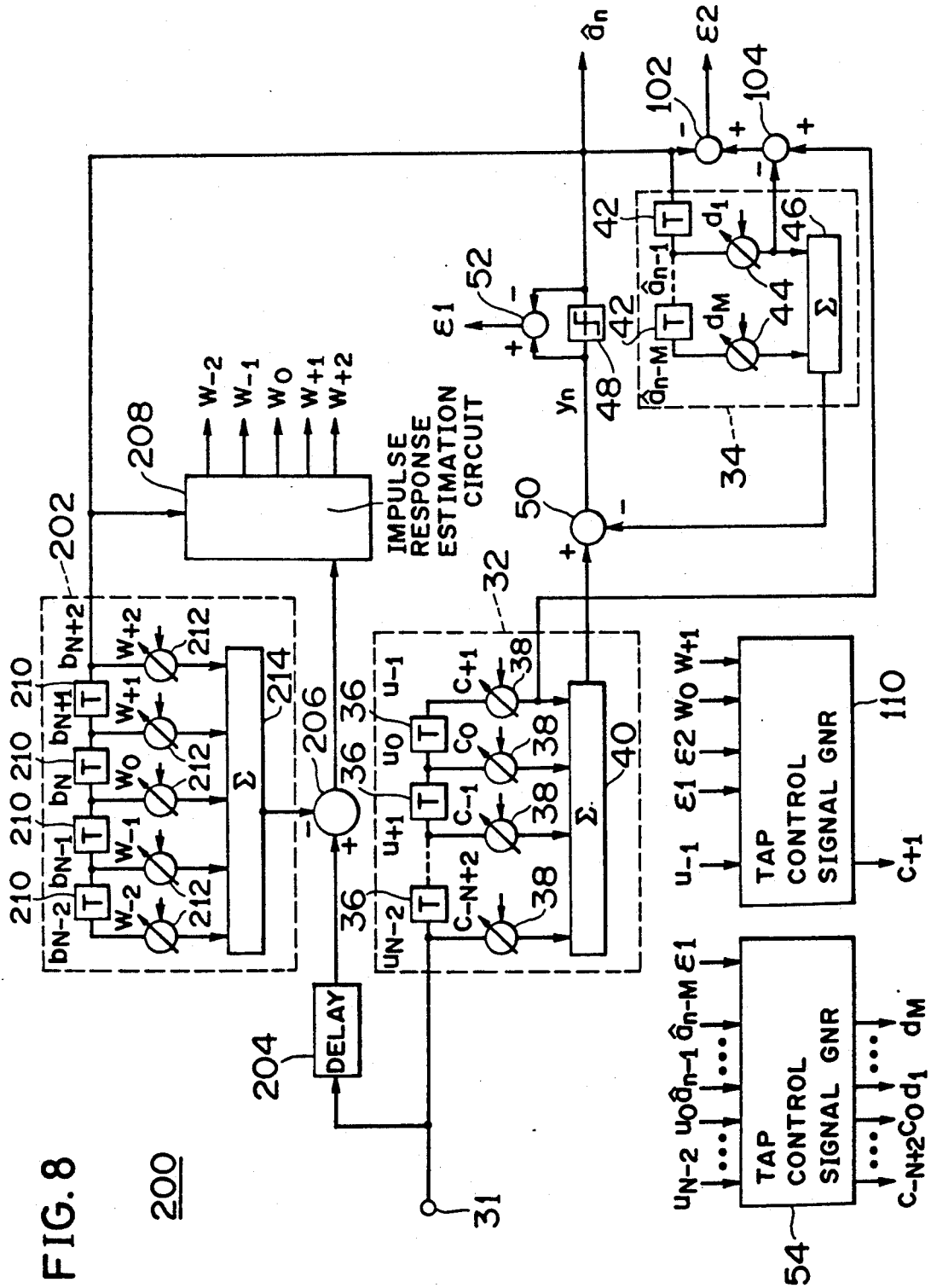
FIG. 8 is a block diagram showing a second embodiment of the present invention (a variant of the first embodiment)

Reference is now made to FIG. 8, where the second embodiment is shown in block diagram form.

The arrangement of FIG. 8 differs from that of FIG. 5 in that the former arrangement includes a linear filter 202, a delay circuit 204, a subtractor 206, and an impulse response estimation circuit 208 instead of the correlators 106 and 108 of FIG. 5. Consequently, the various blocks and functions which are discussed with reference to FIG. 5, will be omitted for brevity. The linear filter 202 includes a plurality of delay elements 210, a plurality of multipliers 212 and an adder 214. The FIG. 8 arrangement is denoted by reference numeral 200.

The linear filter 202 is supplied with the decision signal $â_n$ and the outputs of the impulse response estimation circuit 208 (viz., $W_{+2}$, $W_{+1}$, $W_0$, $W_{-1}$ and $W_{-2}$), and then implements a convolution thereof. The convoluted value is a replica of the reproduced received signal. The subtractor 206 receives the output of the adder 214 and an incoming signal which has been delayed at the delay circuit 204, and outputs a difference between the received two signal and its replica as an error $e$ signal which is applied to the estimation circuit 208.

The impulse response estimation circuit 208 is supplied with the decision signal $â_n$ and the error signal $e$, and generates impulse response estimation discrete values $W_i$ ($i = -2, -1, 0, +1$ and $+2$) by using the following LMS algorithm $$W_i^{n+1} = W_i^n - \alpha e^n â_{n-1} \qquad (28)$$

In equation (28), $\alpha$ is an adjustment coefficient viz., step size parameter, and a parameter $n$ indicates a time point of a symbol. When the decision signal is $â_0$, the signal $â_n$ on the center tap $W_0$ becomes $â_{-3}$. Since the impulse response estimating process requires three symbol intervals, the delay amount of the delay circuit 204 is set to 3 T. The circuit 208 controls the mean square value of the error signal $e$ to be minimized and outputs the impulse response estimation values $W_i$. The outputs $W_0$ and $W_{-1}$ of the circuit 208, which respectively correspond to the main response $h_0$ and the precursor $h_{-1}$, are used to monitor the variations of the precursor $h_{-1}$ relative to $h_0$.

The tap control signal generator 110 is supplied with the inputs $u_{-1}$, $\epsilon 1$, $\epsilon 2$, $W_0$, and $W_{+1}$, and changes the algorithm in accordance the signals $W_0$ and $W_{+1}$, as indicated below.

(29) $|h_{-1}| > \sigma |h_0|$ in the case where $h_{-1}$ increases
$c_{+1}^{n+1} = c_{+1}^n - \mu \epsilon 2^n u_{+1}^{n*}$
(30) $|h_{-1}| < \sigma |h_0|$ in the case where $h-1$ increases or $h-1$ is in steady state or zero
$c_{+1}^{n+1} = c_{+1}^n - \mu \epsilon 1^n u_{+1}^{n*}$
(31) in the case where $h_{-1}$ decreases
$c_{+1}^{n+1} = c_{+1}^n - \mu \epsilon 1^n u_{-1}^{n*}$ In the above equations (29) and (30), $\sigma$ denotes a threshold level. When the precursor $h_{-1}$ is small relative to the main channel response $h_0$ and when the precursor $h_{-1}$ can be equalized by the ordinary algorithm, the threshold level $a$ is used for the main signal route not to be shifted to the tap $c_{+1}$.

Figure 9:
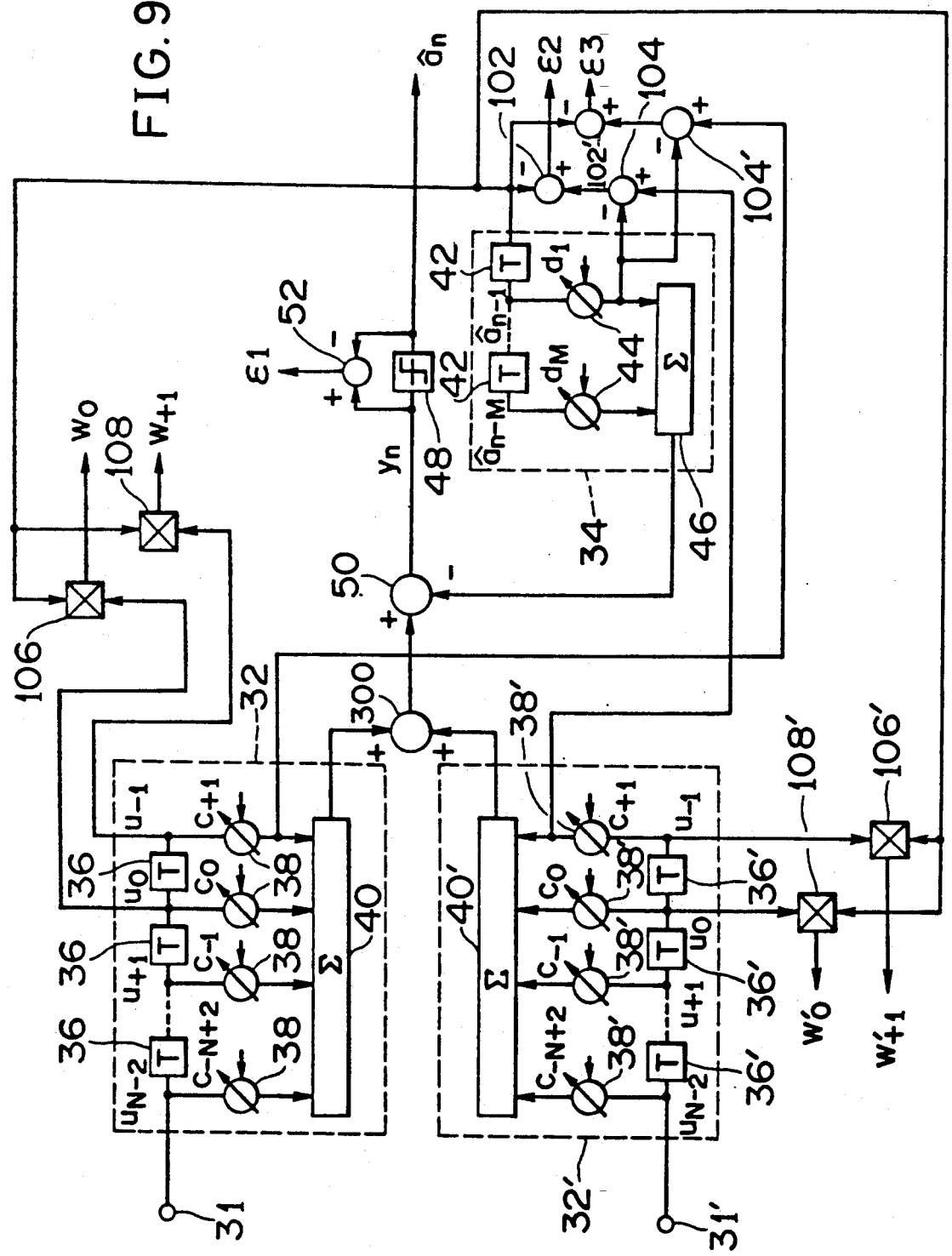
FIG. 9 is a block diagram showing a third embodiment wherein the present invention is applied to diversity reception.

Reference is made to FIG. 9, wherein the third embodiment of the present invention is shown in block diagram.

The third embodiment is concerned with diversity reception utilizing the adaptive equalization scheme which has been discussed with reference to the FIG. 5 arrangement.

The arrangement of FIG. 9 differs from that of FIG. 5 in that the former arrangement further includes a forward equalizer 32', two subtractors 102' and 104', two correlators 106' and 108', and an adder 300. The forward equalizer 32' is configured in exactly the same manner as its counterpart 32.

Each of the blocks newly added in the FIG. 9 arrangement, except for the adder 300, has its counterpart in FIG. 9. For the sake of an easy understanding, each of the newly provided blocks, which have been referred to in connection with FIG. 5, is denoted by like reference numeral plus a prime. The adder 300 is to add the outputs of the two adders 40 and 40', and then applies the output thereof to the subtractor.

The forward equalizers 32 and 32' are provided to receive signals which are transmitted via different communications paths. As mentioned previously, the DFE shown in FIG. 5 exhibits an excellent equalization capability in cancelling the precursor distortion. Therefore, it is clearly understood that the diversity reception using the FIG. 9 arrangement has a number of advantages as referred to the first embodiment.

Although only two forward equalizers are shown in FIG. 9, it is within the scope of the instant invention to provide more than two forward equalizers for more than three diversity paths.

While the foregoing description describes three embodiments according to the present invention, the various alternatives and modifications possible without departing from the scope of the present invention, which is limited only by the appended claims, will be apparent to those skilled in the art. For example, the center tap is one-tap shifted from the final stage of the forward equalizer in the above-mentioned three embodiments. This is because it is assumed that the signal delay over communication paths is within one symbol interval. However, this invention is no longer limited to such a case. The center tap may be shifted by two or more symbol intervals. Further, the present invention has been discussed with reference to a two-path model. However, the present invention is applicable to three or more path models.

What is claimed is:

1. A decision feedback equalizer, comprising:
   first means for implementing linear equalization for an incoming signal, said first means including a transversal filter whose center tap is shifted by at least one symbol interval from a tap provided for the last stage of said transversal filter;
   second means for implementing non-linear equalization for a signal applied thereto;
   third means coupled to receive outputs of said first and second means for generating a difference signal between the outputs of said first second means;
   fourth means coupled to receive the difference signal from said third means, said fourth means issuing a first error signal and a decision signal, said decision signal being applied to said second means;
   fifth means coupled to receive said decision signal and coupled to receive signals appearing on said center tap and a tap provided in said last stage of said transversal filter, said fifth means correlating the received signals and monitoring a main response of channel impulse response of channel impulse response and a precursor; and sixth means for receiving signals from said first and second means and also receiving said decision signal, said sixth means performing subtraction and generating a second error signal, said fifth means changing the distortion equalizing algorithms of said first means in accordance with signals received.

2. The decision feedback equalizer recited in claim 1 wherein said transversal filter comprises:

a plurality of delay means coupled in series for delaying said incoming signal and providing a plurality of tap signals;

a plurality of multiplier means each coupled to multiply a respective one of said plurality of tap signals by a corresponding tap control signal;

summing means for summing product outputs from said plurality of multiplier means and providing an output to said third means; and first and second tap control signal generator means, said first tap control signal generator means being responsive to said tap signals except the last one of said tap signals, said first error signal and said decision signal for generating tap control signals for said plurality of multiplier means except the last one of said multiplier means, said second tap control signal generator means being responsive to said last one of said tap signals, said first and second error signals, and a correlation output of said fifth means for generating the tap control signal for said last one of said multiplier means.

3. The decision feedback equalizer recited in claim 2 wherein said second means including a backward equalizer, said backward equalizer comprising:

a second plurality of delay means coupled in series for delaying said decision signal and providing a second plurality of tap signals;

a second plurality of multiplier means each coupled to multiply a respective one of said second plurality of tap signals by a corresponding tap control signal; and second summing means for summing product outputs from said second plurality of multiplier means and providing an output to said third means, said first tap control generator means also generating said second plurality of tap signals.

4. The decision feedback equalizer recited in claim 3 wherein said fourth means comprises:

decision means having an input and an output and responsive to the output of said third means for generating said decision signal; and subtractor means connected to the input and output of said decision means for generating said first error signal.

5. The decision feedback equalizer recited in claim 4 wherein said sixth means comprises:

first subtractor means connected to receive outputs from said first and second means for generating a second difference signal; and second subtractor means connected to receive said decision signal and said second difference signal for generating said second error signal.

6. The decision feedback equalizer recited in claim 5 wherein said fifth means comprises:

first correlator means connected to receive said decision signal and the last one of said plurality of tap signals for generating a first correlation signal; and second correlator means connected to receive said decision signal and the next to last one of said plurality of tap signals for generating a second correlation signal, said first and second correlation signals being said correlation output.

7. The decision feedback equalizer recited in claim 6 wherein said equalizer is used in a diversity reception system, said equalizer further comprising:

a plurality of first, second and sixth means, one for each channel of said diversity reception system; and summing means connected to sum outputs from each of said plurality of first means for generating an output signal to said fourth means.

8. The decision feedback equalizer recited in claim 5 wherein said fifth means comprises:

linear filter means connected to receive said decision signal from said fourth means for generating a linear filtered output;

delay means connected to receive said incoming signal and generating a delayed signal;

subtractor means connected to receive said linear filtered output from said linear filter means and said delayed signal from said delay means for generated a second difference signal; and impulse response estimation means responsive to said decision signal and said second difference signal for generating a plurality of correlation output signals, said plurality of correlation output signals constituting said correlation output.

* * * * *